United States Patent
Kreisig et al.

(10) Patent No.: US 10,066,515 B2
(45) Date of Patent: Sep. 4, 2018

(54) ADJUSTABLE CAMSHAFT

(71) Applicant: Mahle International GmbH, Stuttgart (DE)

(72) Inventors: Michael Kreisig, Gerlingen (DE); Juergen Rommel, Burgstetten (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/367,148

(22) Filed: Dec. 1, 2016

(65) Prior Publication Data
US 2017/0159506 A1  Jun. 8, 2017

(30) Foreign Application Priority Data
Dec. 2, 2015  (DE) .......................... 10 2015 224 014

(51) Int. Cl.
*F01L 1/047* (2006.01)
*F16H 53/04* (2006.01)

(52) U.S. Cl.
CPC ............. *F01L 1/047* (2013.01); *F16H 53/04* (2013.01); *F01L 2001/0473* (2013.01); *F01L 2103/00* (2013.01)

(58) Field of Classification Search
CPC ....... F01L 2001/0473; F01L 2001/0471; F01L 2001/0475; F01L 1/34413; F01L 1/047; F01L 1/34416; F16H 53/04; F16H 53/02; F16H 53/025; G16H 25/10
See application file for complete search history.

(56) References Cited

U.S. PATENT DOCUMENTS

| 5,235,939 A * | 8/1993 | Levin ...................... F01L 1/047 123/90.15 |
| 5,664,463 A * | 9/1997 | Amborn ............... B21D 53/845 123/90.6 |
| 2007/0144469 A1 | 6/2007 | Kroos et al. |

(Continued)

FOREIGN PATENT DOCUMENTS

| DE | 102011078818 A1 | 1/2013 |
| DE | 102014116774 A1 | 6/2015 |
| DE | 102014206950 A1 | 10/2015 |

(Continued)

OTHER PUBLICATIONS

Machine Translation of DE 10 2014 116 774, obtained Nov. 15, 2017.*

(Continued)

*Primary Examiner* — Richard W Ridley
*Assistant Examiner* — Brian J McGovern
(74) *Attorney, Agent, or Firm* — Fishman Stewart PLLC

(57) ABSTRACT

An adjustable camshaft may include an inner shaft and an outer shaft arranged coaxially thereto, a first element connected to the inner shaft in a rotationally fixed manner via a first pin guided through a first elongated hole of the outer shaft extending in a circumferential direction, and a second element connected to the outer shaft in a rotationally fixed manner. The inner shaft may be fixed in the axial direction with respect to the outer shaft via the first elongated hole and the first pin guided therein, via a second elongated hole matched to a second pin guided therein, or via the first elongated hole, a third elongated hole opposite the first elongated hole, and the first pin guided therein.

18 Claims, 2 Drawing Sheets

(56) References Cited

U.S. PATENT DOCUMENTS

2015/0167506 A1   6/2015 Kim

FOREIGN PATENT DOCUMENTS

DE    102014213937 A1   1/2016
DE    102015200139 A1   7/2016

OTHER PUBLICATIONS

European Search Report for EP 16198458.8 dated Mar. 27, 2017.
English abstract for DE-102011078818.
English abstract for DE-102014206950.
English abstract for DE-102015200139.
English abstract for DE-102014213937.

* cited by examiner

ADJUSTABLE CAMSHAFT

CROSS-REFERENCE TO RELATED APPLICATIONS

This application claims priority to German Patent Application No. DE 10 2015 224 014.2, filed on Dec. 2, 2015, the contents of which are hereby incorporated by reference in its entirety.

TECHNICAL FIELD

The present invention relates to an adjustable camshaft with an inner shaft and an outer shaft coaxially arranged thereto.

BACKGROUND

Adjustable camshafts are thoroughly known already and are employed in modern internal combustion engines for influencing valve opening times. Usually so-called cam in cam solutions are used for this purpose in the case of which the camshaft comprises an outer shaft and an inner shaft that is arranged coaxially thereto and adjustable thereto, i.e. rotatable. The mounting of such camshafts is usually effected by way of a face shifter, which is connected for example with its stator to the outer shaft and with its rotor to the inner shaft. The stator of the face shifter in turn is fixed in axial direction with respect to the rotor of the face shifter.

SUMMARY

The present invention deals with the problem of stating an improved or at least an alternative embodiment for a camshaft of the generic type, which is characterized in particular by a changed axial mounting of the camshaft.

According to the invention, this problem is solved through the subject of the independent claims. Advantageous embodiments are subject of the dependent claims.

The present invention is based on the general idea of bringing about an axial mounting of an adjustable camshaft with an inner shaft and an outer shaft for the first time no longer solely via a rotor or a stator of a face shifter but to already mount the inner shaft in axial direction with respect to the outer shaft, so that the axial mounting of the entire camshaft for example is possible solely via the inner shaft or the outer shaft. The adjustable camshaft according to the invention in this case comprises in the known manner an outer shaft and a rotatable inner shaft arranged coaxially thereto, likewise a first function element, for example a cam, an encoder wheel or a bearing ring, which via a first pin is connected to the inner shaft in a rotationally fixed manner, wherein this first pin is guided through a first elongated hole of the outer shaft extending in circumferential direction. Furthermore, the adjustable camshaft comprises a second function element for example a cam, an encoder wheel or a bearing ring, which is connected to an outer shaft in a rotationally fixed manner, for example by means of a thermal joining fit, by means of gluing, by means of welding, a press fit or soldering. According to the invention, three alternatives according to the invention are now conceivable, namely that the first elongated hole is matched to the first pin guided therein in such a manner that via the first pin and the first elongated hole the inner shaft is fixed in axial direction with respect to the outer shaft. Alternatively to this, a second elongated hole can also be provided, which is matched to a second pin guided therein in such a manner that via the second pin and the second elongated hole the inner shaft is fixed in axial direction with respect to the outer shaft. Again alternatively it can be provided that the first elongated and a third elongated hole opposite are provided which are matched to the first pin guided therein in such a manner that via the first pin and the two elongated holes the inner shaft is fixed in axial direction with respect to the outer shaft. In the case of the first and third alternative both an axial mounting of the inner shaft on the outer shaft and also a twisting of the first function element relative to the outer shaft takes place via the first pin while in the case of the second alternative the twisting of the first function element relative to the outer shaft is brought about by way of a first pin guided with play in a first elongated hole and the axial bearing function takes place exclusively via the second pin guided in the second elongated hole. Obviously it is clear in this case that the camshaft according to the invention can additionally comprise further first and second function elements, for example cams, wherein the further pins required for the twisting of the further first function elements exclusively serve for this function but not for the axial fixing. With the camshaft according to the invention an axial fixing of the inner shaft relative to the outer shaft takes place for the first time via a first or second pin and thus departing from the previous mounting principle of the inner shaft and of the outer shaft via the stator or rotor of a face shifter.

In an advantageous further development of the solution according to the invention corresponding to the first alternative a clear width of the first elongated hole substantially corresponds to an outer diameter of the first pin guided therein, so that the first pin is guided in the first elongated hole on both sides and the inner shaft is fixed in axial direction with respect to the outer shaft. The first pin is thus received free of play in a corresponding bore in the inner shaft and likewise guided preferentially almost free of play in the first elongated hole.

In a further advantageous embodiment of the solution according to the invention corresponding to the third alternative, the first pin completely crosses the inner shaft and is connected to the first function element via the first elongated hole and the third elongated hole located opposite in the outer shaft, wherein the first pin is guided free of play on both sides in both elongated holes. Compared with the camshaft according to the previous paragraph, two elongated holes located opposite provided for the first pin are thus provided, both assuming the axial fixing of the inner shaft relative to the outer shaft.

Purely theoretically, the first and the third elongated hole in this case can also be designed so wide that the first pin is guided therein with play, wherein in this case the two elongated holes, i.e. the first and the third elongated hole are arranged offset relative to one another in axial direction, so that the first pin is guided in the first elongated hole on the one side and in the third elongated hole located opposite on the other side and because of this in each elongated hole on one side, but on the whole guided on both sides.

In a further advantageous embodiment of the solution according to the invention corresponding to the second alternative, the second pin is guided on both sides in the associated second elongated hole and does not engage in a cross section of the inner shaft. The second pin and the second elongated hole thus do not serve for the adjustment of the first function element but exclusively for the axial fixing of the inner shaft relative to the outer shaft. A twisting of the inner shaft relative to the outer shaft in this case takes place by the first pin which is arranged in the inner shaft and connected to the first function element via an associated first elongated hole. Since the guiding and axial fixing function is already brought about by the second pin and the second elongated hole the first pin can be arranged with play in the first elongated hole.

Practically, the first pin is guided in the first or third elongated hole with a play s of 0.03 mm<s<0.08 mm, in particular with a play s of approximately 0.05 mm, wherein alternatively the second pin is guided in the second elongated hole with the same play. The mentioned size indications already show that the first pin and the second pin are guided almost free of play in the respective associated first, third or second elongated hole and thereby bring about the axial bearing function. When the first pin merely serves for the twisting of the first cam and when the axial bearing function or the axial fixing function is brought about via the second pin, the first pin can also be guided in the first elongated hole with a significantly greater play s, for example with a play s of approximately 1.2 mm. The same obviously applies also to all further pins with all further first cams.

Practically, a face shifter for the twisting of the inner shaft relative to the outer shaft is provided, wherein the first function element is arranged directly adjacent to the face shifter. This offers the great advantage that the axial bearing function as in the case of conventional camshafts known from the prior art also takes place in a region or in a closely adjacent region to the face shifter.

Practically, the face shifter comprises a rotor and a stator, wherein the stator is connected axially fixed to the outer shaft and the rotor axially moveably to the inner shaft, or wherein the stator is connected axially moveably to the outer shaft and the rotor axially fixedly to the inner shaft, or the stator is connected axially moveably to the outer shaft and the rotor axially moveably to the inner shaft. In the two first alternatives it is thus possible to mount the entire camshaft in axial direction exclusively via the inner shaft or the outer shaft since in this case either the inner shaft is connected in a fixed manner to the rotor or the outer shaft to the stator of the face shifter. Purely theoretically an entirely floating mounting of the camshaft is also conceivable, wherein in this case the axial bearing function of the inner shaft relative to the outer shaft exclusively takes place via the first or second pin and the entire camshaft in this case is additionally mounted again by an external axial bearing.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and are explained in more detail in the following description, wherein same reference numbers relate to same or similar or functionally same components.

There it shows, in each case schematically.

DETAILED DESCRIPTION

Figure 1:
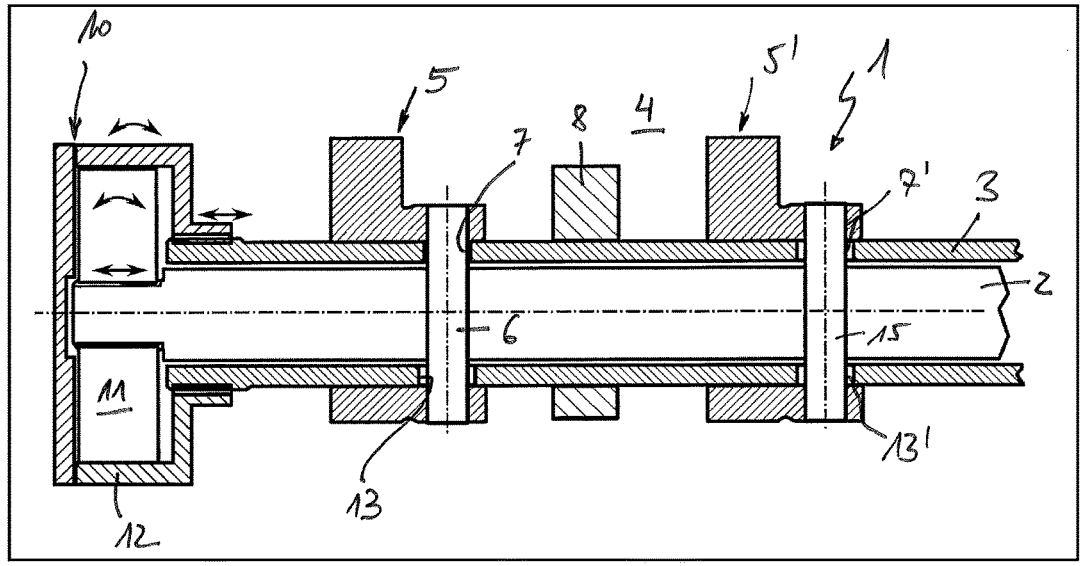
FIG. 1 a sectional representation through an adjustable camshaft with a face shifter according to the invention, FIGS. 2 to 4 in each case a representation as in FIG. 1, however without face shifter and with first cams configured differently in each case.

According to FIGS. 1 to 4, a camshaft 1 according to the invention comprises an outer shaft 3 and an inner shaft 2 that is arranged coaxially thereto and twistable relative to the outer shaft 3. Such a camshaft 1 according to the invention is employed for example in an internal combustion engine 4 of a motor vehicle. In addition to this, the camshaft 1 comprises a first function element 5 which is connected to the inner shaft 2 via a first pin 6 in a rotationally fixed manner, wherein the first pin 6 is guided through a first elongated hole 7 of the outer shaft 3 extending in circumferential direction. In addition to this a second function element 8 is provided, which is connected to the outer shaft 3 in a rotationally fixed manner, for example thermally joined, glued, welded, screwed or soldered to the same. The first function element 5, the further first function element 5' and/or the second function element 8 in this case can be designed as cams, as encoder wheel or as bearing ring.

Figure 3:
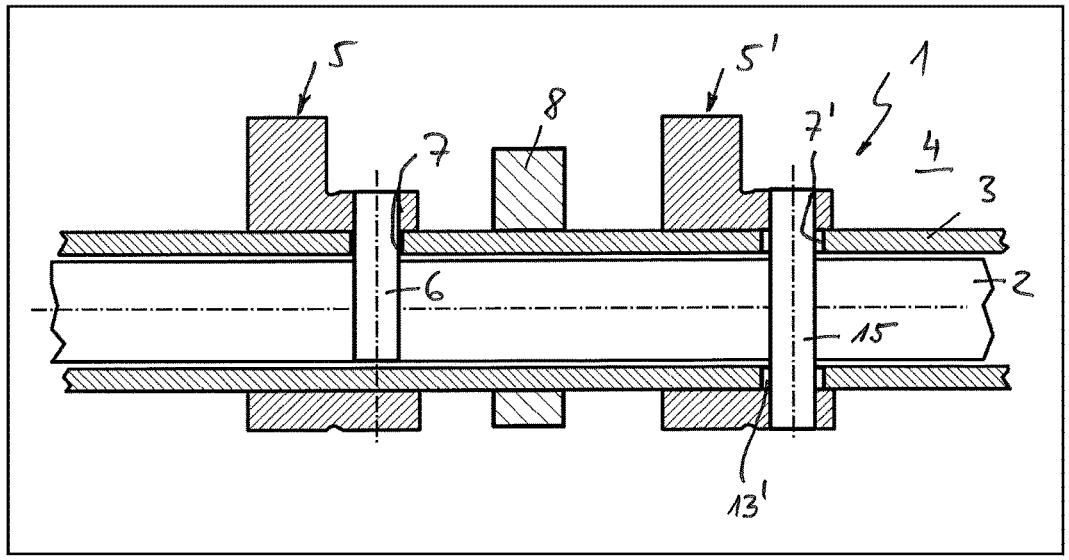
Figure 4:
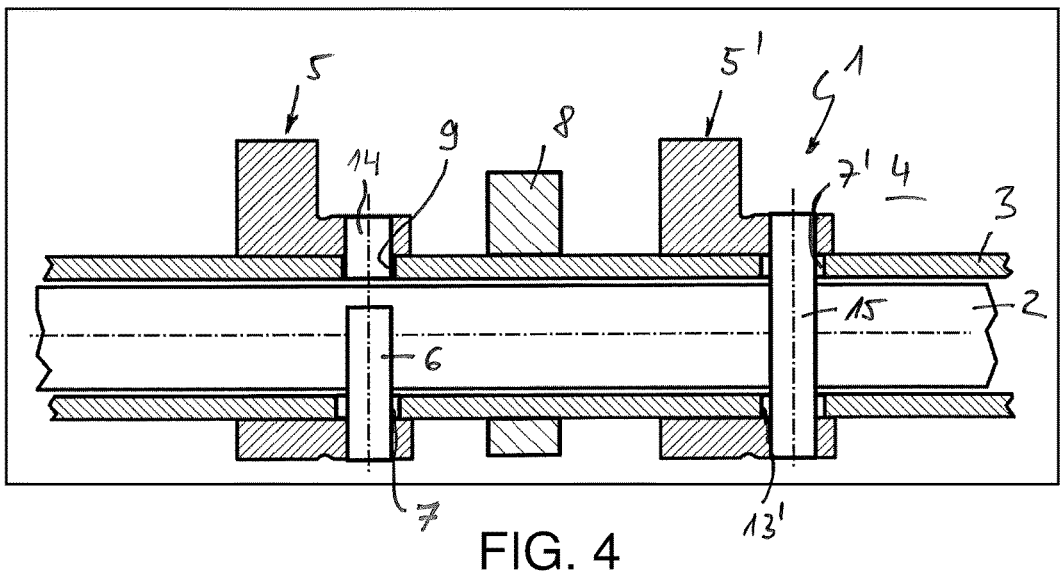

According to the invention it is now either provided that the first elongated hole 7 is matched to the first pin 6 guided therein in such a manner that via the first pin 6 and the first elongated hole 7 the inner shaft 2 is mounted in axial direction with respect to the outer shaft 3 and thus fixed (see FIGS. 1 and 3) or that a second elongated hole 9 is provided, which is matched to a second pin 14 guided therein in such a manner that via this second pin 14 and the second elongated hole 9 the inner shaft 2 is mounted in axial direction with respect to the outer shaft 3 and thus fixed (see FIG. 4). Again alternatively it can also be provided that the first pin is guided in the first elongated hole 7 and in a third elongated hole 13 located opposite in such a manner that via the first pin 6 and the first and third elongated hole 7, 13 the inner shaft 2 is fixed in axial direction with respect to the outer shaft 3 (see FIG. 2). According to FIG. 1, a face shifter 10 with a rotor 11 and a stator 12 for relative twisting of the inner shaft 2 relative to the outer shaft 3 is additionally drawn in, wherein this face shifter 10 is obviously also present in the case of the camshafts 1 according to FIGS. 2-4, but was not drawn in there for the sake of clarity.

According to the invention, the axial mounting of the inner shaft 2 relative to the outer shaft 3 is no longer brought about via the rotor 11 or the stator 12 of the face shifter 10, but either via the first pin 6 or second pin 14.

Figure 2:
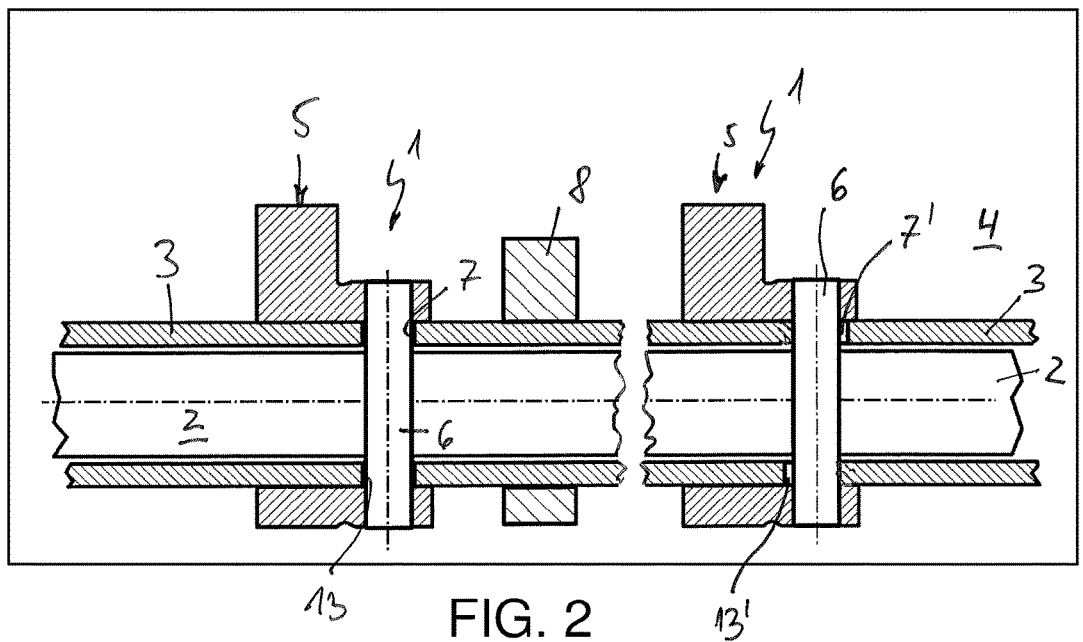

Looking at the representations according to FIGS. 1-3 it is evident that a clear width of the first elongated hole 7 substantially corresponds to an outer diameter of the first pin 6 guided therein, so that the first pin 6 is guided on both sides in the first elongated hole and because of this the inner shaft 2 is fixed in axial direction with respect to the outer shaft 3. Here, the first pin 6 can completely cross the inner shaft 2, as is shown for example according to FIGS. 1 and 2, or not completely, as is shown for example according to FIG. 3.

Looking at the embodiments of the camshaft 1 according to the invention according to FIGS. 1 and 2 it is evident that the first pin 6 is connected to the first function element 5 via the first elongated hole 7 and a third elongated hole 13 located opposite in the outer shaft 3, wherein the first pin 6 according to FIG. 1 is guided on both sides exclusively in the first elongated hole 7 and according to the left representation in FIG. 2 on both sides in both elongated holes 7, 13. In the representation according to FIG. 1 the third elongated hole 13 is embodied with play to the first pin 6 so that the axial function in this case is exclusively performed via the first elongated hole 7 while in the left and right representation of FIG. 2 both elongated holes 7, 13 assume this function.

Looking at the right representation in FIG. 2, a further version of the camshaft 1 according to the invention is evident there, in the case of which the first pin 6 completely crosses the inner shaft 2 and is connected to the first function element 5 via the first elongated hole 7 and the third elongated hole 13 located opposite in the outer shaft 3. The two elongated holes 7, 13 however are not arranged aligned with one another in this case as drawn in the left representation according to FIG. 2 or in FIG. 1, but offset in axial direction relative to one another so that the first pin 6 in the first elongated hole 7 lies against and is guided on the one side, in this case the left side, and in the third elongated hole 13 located opposite lies against and is guided on the other side, in this case the right side. In this case, both elongated holes 7, 13 are thus formed with play with respect to the first pin 6 guided therein, but arranged offset relative to one another in axial direction in such a manner that through interaction of the two elongated holes 7, 13 and of the first pin 6 guided therein axial fixing of the inner shaft 2 relative to the outer shaft 3 can nevertheless take place.

Looking at the embodiment of the camshaft 1 according to the invention according to FIG. 3 it is evident here that the first pin 6 completely crosses but not completely penetrates the inner shaft 2 and is only connected to the first function element 5 via the first elongated hole 7 in the outer shaft 3, wherein in this case the clear width of the first elongated hole 7 substantially corresponds to an outer diameter of the first pin 6 guided therein, as a result of which the first pin 6 is guided in the first elongated hole 7 on both sides.

A play s, by means of which the first pin 6 is guided in the first and/or third elongated hole 7, 13 or the second pin 14 in the second elongated hole 9 in this case can be between 0.03 mm and 0.08 mm, preferably at s approximately 0.05 mm. However this applies exclusively in particular provided that the first, second or third elongated hole 7, 9, 13 is used for the axial fixing of the inner shaft 2 relative to the outer shaft 3. When by contrast no axial bearing function is required, the first pin 6 can also be guided for example in the third elongated hole 13 with a play s of approximately 1.2 mm (see FIGS. 1 and 3). This obviously requires that the first function element 5 performing the axial bearing function is arranged directly adjacent to the face shifter 10, wherein on the camshaft 1 according to the invention further first function elements 5' can obviously also be arranged, which with a third pin 15 are connected to the inner shaft 2 in a torque-transmitting manner. The first pin 15 in this case exclusively serves for the torque transmission and not for the axial bearing function at all, so that in this case the first elongated hole 7' and the third elongated hole 13' located opposite have a clear play to the third pin 15.

The face shifter 10, as described at the outset, in this case comprises a rotor 11 and a stator 12, wherein the stator 12 can be connected axially fixed to the outer shaft 3 and the rotor 11 axially moveably to the inner shaft 2. Alternatively to this it is also conceivable that the stator 12 is connected axially moveably to the outer shaft 3 and the rotor 11 axially fixedly to the inner shaft 2, or that the stator 12 is connected axially moveably to the outer shaft 3 and the rotor 11 axially moveably to the inner shaft 2 and in this case the camshaft 1 according to the invention is axially mounted in another place. Purely theoretically however it is also conceivable that for example an axial fixing of the rotor 11 on the one hand on the stator 12 and on the other hand on the inner shaft 2 takes place, wherein the outer shaft 3 is floatingly mounted with respect to the stator 12 of the face shifter 10 and is merely axially fixed via the first pin 6 or the second pin 14. Likewise also conceivable is the inverted version, in the case of which the outer shaft 3 is connected fixed in axial direction to the stator 12 of the face shifter 10, but the inner shaft 2 is floatingly mounted with respect to the rotor 11 of the face shifter 10, so that in this case the axial fixing of the inner shaft 2 takes place via the pinning to the outer shaft 3.

The invention claimed is:

1. An adjustable camshaft comprising:
   an inner shaft and an outer shaft arranged coaxially thereto, the outer shaft having a first elongated hole, a second elongated hole, and a third elongated hole, each having a respective axial center axis;
   a first element, which via a first pin is connected to the inner shaft in a rotationally fixed manner, wherein the first pin is guided through the first elongated hole and the third elongated hole of the outer shaft extending in a circumferential direction;
   a second element, which is connected to the outer shaft in a rotationally fixed manner;
   wherein the first pin completely crosses the inner shaft and, via the first elongated hole and the third elongated hole, is connected to the first element, and wherein the first and third elongated holes are arranged such that the respective axial center axes of the first and third elongated holes are offset in an axial direction with respect to one another along an axis of rotation of the inner shaft.

2. The camshaft according to claim 1, wherein a width of the first elongated hole substantially corresponds to an outer diameter of the first pin guided therein, so that the first pin is guided on diametrically opposing sides in the first elongated hole and the inner shaft is fixed in the axial direction with respect to the outer shaft.

3. The camshaft according to claim 1, wherein the first pin is guided on diametrically opposing sides in one of the first and third elongated holes.

4. The camshaft according to claim 1, wherein the first pin in the first elongated hole is guided on one side and in the third elongated hole on another side.

5. The camshaft according to claim 1, further comprising a second pin is guided on diametrically opposing sides in the second elongated hole, wherein the second pin does not engage in a cross section of the inner shaft.

6. The camshaft according to claim 1, wherein:
   the first pin is guided with a play ranging between 0.03 mm and 0.08 mm in the first or third elongated hole.

7. The camshaft according to claim 1, further comprising at least one further first element with a second pin guided in at least one of the second elongated hole and a fourth elongated hole with a play of approximately 1.20 mm.

8. The camshaft according to claim 1, further comprising a face shifter, wherein the first element is arranged directly adjacent to the face shifter.

9. The camshaft according to claim 8, wherein the face shifter includes a rotor and a stator, wherein one of:
   the stator is connected axially and fixedly to the outer shaft, and the rotor is connected axially and moveably to the inner shaft;
   the stator is connected axially and moveably to the outer shaft, and the rotor is connected axially and fixedly to the inner shaft; or
   the stator is connected axially and moveably to the outer shaft, and the rotor is connected axially and moveably to the inner shaft.

10. The camshaft according to claim 1, wherein at least one of the first element and the second element is one of a cam, an encoder wheel, and a bearing ring.

11. An internal combustion engine comprising a camshaft having:
- an inner shaft and an outer shaft arranged coaxially thereto, the outer shaft having a first elongated hole, a second elongated hole, and a third elongated hole, each having a respective axial center axis;
- a first element, which via a first pin is connected to the inner shaft in a rotationally fixed manner, wherein the first pin is guided through the first elongated hole and the third elongated hole of the outer shaft extending in a circumferential direction;
- a second element, which is connected to the outer shaft in a rotationally fixed manner;
- wherein the first pin completely crosses the inner shaft and, via the first elongated hole and the third elongated hole, is connected to the first element, and wherein the first and third elongated holes are arranged such that the respective axial center axes of the first and third elongated holes are offset in an axial direction with respect to one another along an axis of rotation of the inner shaft.

12. The camshaft according to claim 2, wherein the first pin is guided on diametrically opposing sides in one of the first and third elongated holes.

13. The camshaft according to claim 6, wherein the play of the first pin ranges between 0.03 mm and approximately 0.05 mm.

14. The camshaft according to claim 2, wherein:
- the first pin is guided with a play ranging between 0.03 mm and 0.08 mm in the first or third elongated hole.

15. The camshaft according to claim 2, further comprising a face shifter, wherein the first element is arranged directly adjacent to the face shifter.

16. The camshaft according to claim 15, wherein the face shifter includes a rotor and a stator, wherein one of:
- the stator is connected axially and fixedly to the outer shaft, and the rotor is connected axially and moveably to the inner shaft;
- the stator is connected axially and moveably to the outer shaft, and the rotor is connected axially and fixedly to the inner shaft; or
- the stator is connected axially and moveably to the outer shaft, and the rotor is connected axially and moveably to the inner shaft.

17. An adjustable camshaft comprising:
- an inner shaft and an outer shaft arranged coaxially thereto, the outer shaft having a first elongated hole, a second elongated hole, and a third elongated hole, each having a respective axial center axis;
- a first element, which via a first pin is connected to the inner shaft in a rotationally fixed manner, wherein the first pin is guided through the first elongated hole and the third elongated hole of the outer shaft extending in a circumferential direction;
- a second element, which is connected to the outer shaft in a rotationally fixed manner; and
- a face shifter including a rotor and a stator, wherein the first element is arranged directly adjacent to the face shifter;
- wherein the first pin completely crosses the inner shaft and, via the first elongated hole and the third elongated hole, is connected to the first element, and wherein the first and third elongated holes are arranged such that the respective axial center axes of the first and third elongated holes are offset in an axial direction with respect to an axial center axis of the first pin, so that the first pin in the first elongated hole is guided on one side and in the third elongated hole on another side.

18. The camshaft according to claim 17, wherein the face shifter includes a rotor and a stator, wherein one of:
- the stator is connected axially and fixedly to the outer shaft, and the rotor is connected axially and moveably to the inner shaft;
- the stator is connected axially and moveably to the outer shaft, and the rotor is connected axially and fixedly to the inner shaft; or
- the stator is connected axially and moveably to the outer shaft, and the rotor is connected axially and moveably to the inner shaft.

* * * * *